March 6, 1945.  S. WESTIN ET AL  2,371,090
ELECTRIC PIPE FORMING
Filed Oct. 30, 1942   3 Sheets-Sheet 1
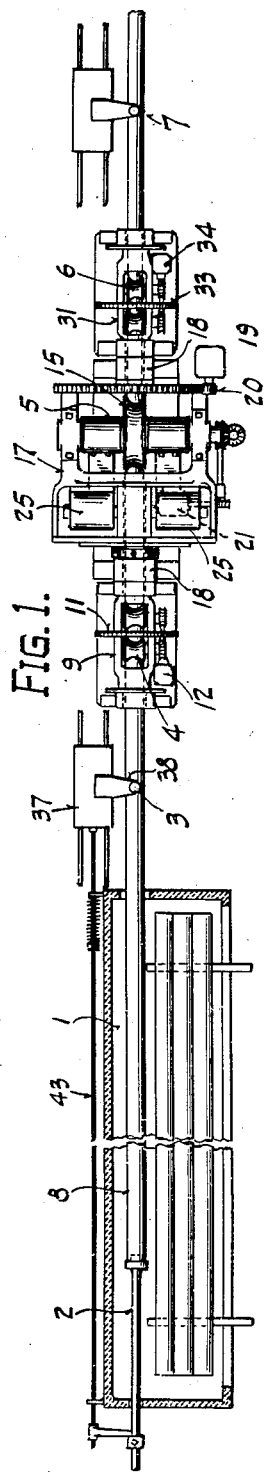
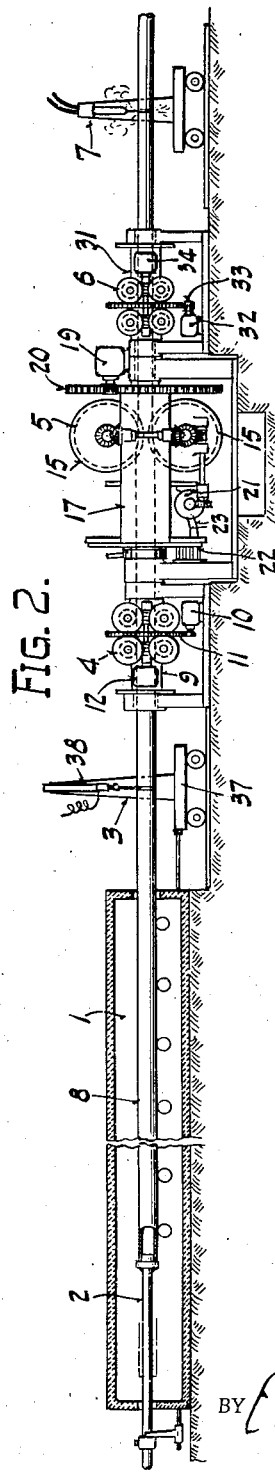
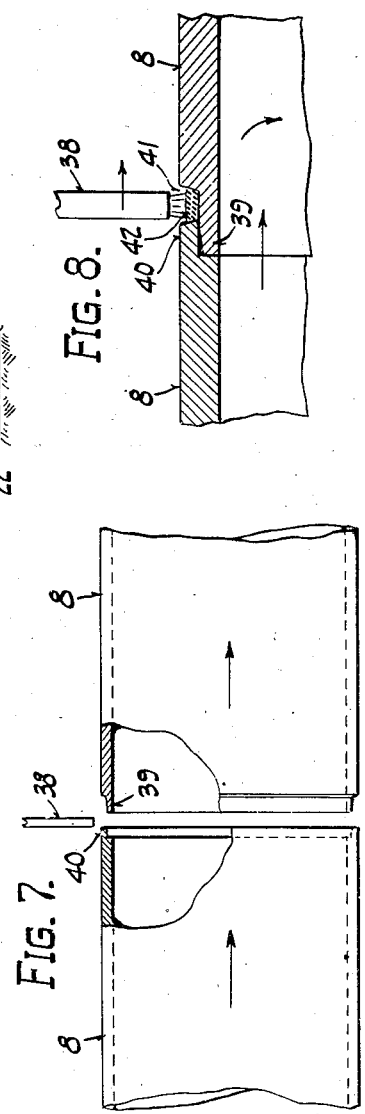
Sven Westin
Axel Westin
INVENTORS.
BY
ATTORNEY.

March 6, 1945.　　S. WESTIN ET AL　　2,371,090
ELECTRIC PIPE FORMING
Filed Oct. 30, 1942　　3 Sheets-Sheet 2
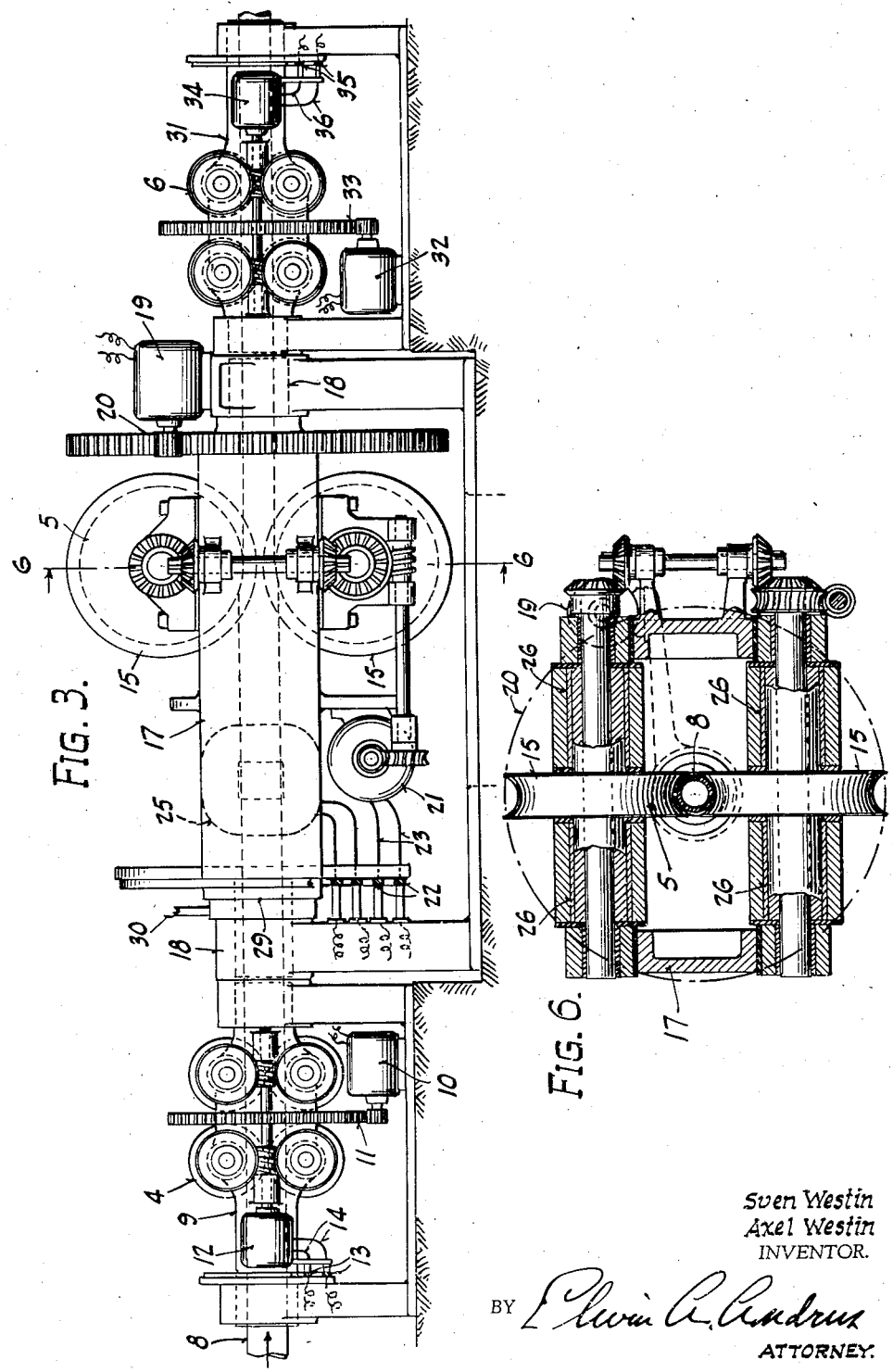
Sven Westin
Axel Westin
INVENTOR.
BY
ATTORNEY.

March 6, 1945.   S. WESTIN ET AL   2,371,090
ELECTRIC PIPE FORMING
Filed Oct. 30, 1942   3 Sheets-Sheet 3

Sven Westin
Axel Westin
INVENTORS

BY *[signature]*
ATTORNEY.

Patented Mar. 6, 1945

2,371,090

UNITED STATES PATENT OFFICE 2,371,090

ELECTRIC PIPE FORMING

Sven Westin, West Allis, and Axel Westin, Milwaukee, Wis., assignors to A. O. Smith Corporation, Milwaukee, Wis., a corporation of New York Application October 30, 1942, Serial No. 463,958

20 Claims. (Cl. 219—3)

This invention relates to electric pipe forming and more particularly to the reduction in diameter of pipe and tubing.

The principal object of the invention is to effect a large reduction in diameter in a single operation.

Another object is to provide an apparatus for the purpose described in which the electrodes and forming dies are rotated and the blank fed axially through the same.

Another object is to provide feeding mechanism at both the entrance and exit to the dies to give a control of thickening of the blank.

Another object is to more readily heat the blank during forming and to consolidate heating and forming operations to conserve on heat.

Other objects and advantages of the invention will appear hereinafter.

The invention is illustrated in the accompanying drawings in which:

Figure 1 is a schematic plan view of an apparatus embodying the invention;

Fig. 2 is a schematic side elevation of the apparatus of Fig. 1;

Fig. 3 is an enlarged side elevational view of the forming apparatus and of the feed rolls for rotating the blank while feeding it forward;

Fig. 6 is a transverse section taken through the throat of the dies on line 6—6 of Fig. 3;

Fig. 7 is a detail side elevational view, partly in section, of adjacent blank ends just prior to being joined; and Fig. 8 is a detail enlarged view showing the welding of blanks end to end on the fly while feeding the same to the forming apparatus.

Figure 4:
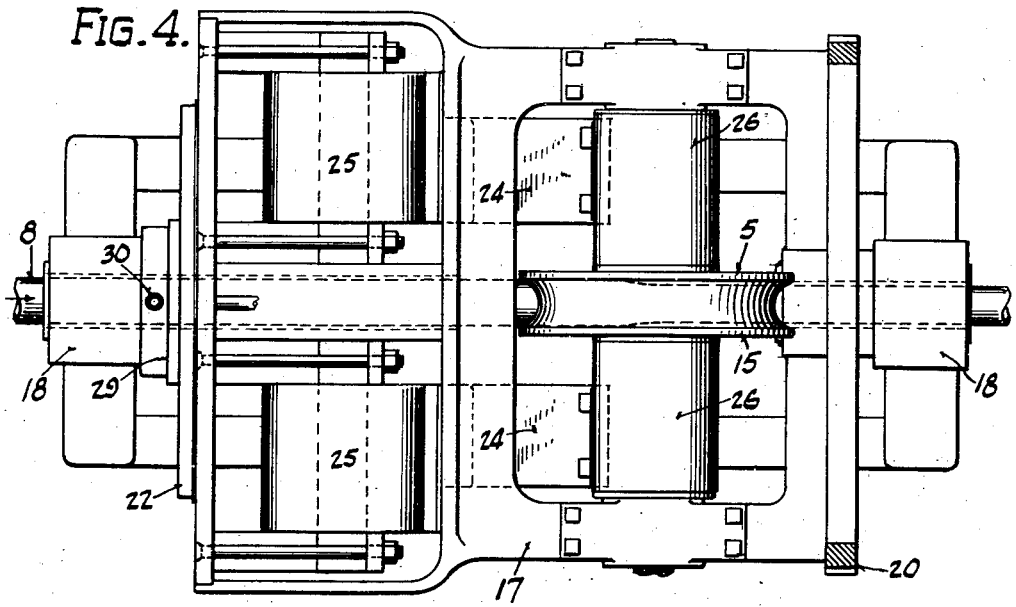
Fig. 4 is a top plan of the forming apparatus.
Figure 5:
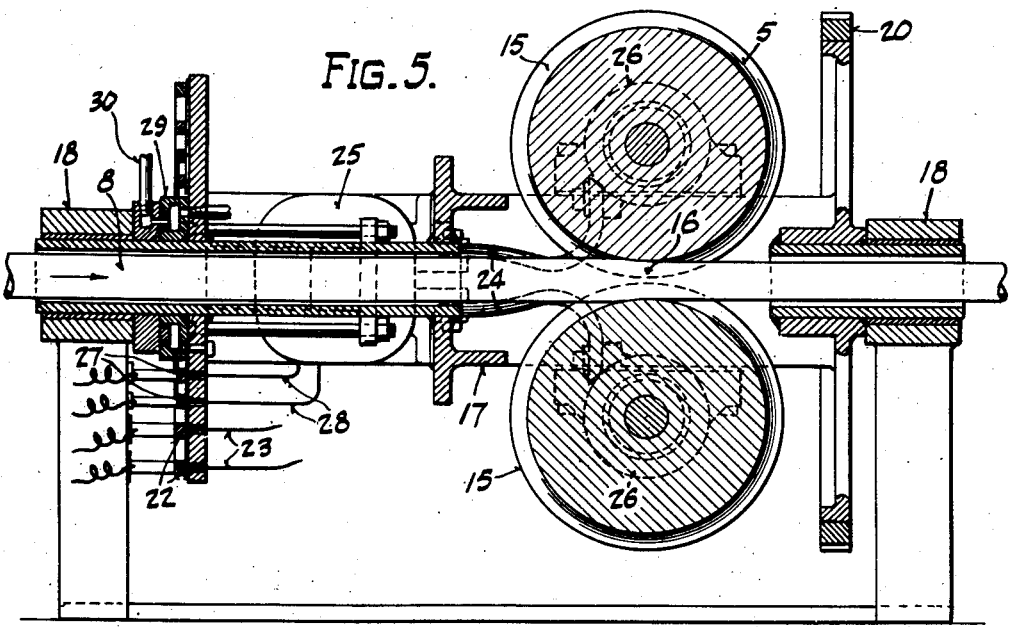
Fig. 5 is an axial section through the forming apparatus.

In carrying out the invention, the general process set forth and claimed in copending application for United States patent, Serial No. 376,669, filed January 30, 1941, for "Method of treating metallic bodies" by the present inventors, now Patent No. 2,309,561, dated January 26, 1943, is employed to effect simultaneous heating and forming of the blanks, the latter being passed through the electrode die members and being fed in a continuous succession of attached blanks.

The apparatus comprises, in general, a furnace 1, a pusher 2 for feeding blanks from the furnace, a welding station or machine 3 for welding blanks end to end as they are fed from the furnace, a set of feed rolls 4 for feeding the blanks in succession to the forming machine 5, a set of rolls 6 for receiving the reduced pipe from the forming machine, and a flying cutter 7 for severing the pipe into proper lengths.

The furnace 1 may or may not be employed, depending upon the thickness and size of the blanks. The purpose of the furnace is to provide an initial heating of the blanks by gas or other economical fuel so that the more expensive electric heating is relied upon for only a minor portion of the heat.

The blank 8 may be heated in the furnace to a temperature of about 900° F. It is then pushed longitudinally through the exit opening in the furnace by the pusher 2. It enters the rolls 4 which may effect a slight reduction of the blank to obtain a sufficient gripping thereof and feed it into the forming machine 5.

The feed rolls 4 may comprise a plurality of stands with the rolls of the first stand effecting the preliminary reduction. The rolls of the second stand may be either in alignment with those of the first as shown, or staggered relative thereto. The rolls 4 are mounted in a cage 9 which in turn is supported for rotation on the axis of the blank 8 passing therethrough.

The cage 9 is rotated slowly by means of the motor 10 and gearing 11. The rolls 4 are driven by means of a motor 12 carried by the cage 9 and supplied with current through suitable collector rings 13 and leads 14.

The rotation of the cage 9 provides a rotation of the blank as it is fed into the forming machine 5 by the feed rolls.

The forming machine 5 comprises a pair of electrode die rolls 15 of large diameters and having their outer peripheries grooved circumferentially to provide a tapered die opening 16. The groove in the rolls may be semicircular, in which instance the radius should be substantially that of the finished pipe and the edge portions should be enlarged to provide for engaging the large diameter blank without seating the latter in the bottom of the groove until the reduction is accomplished and the blank passes through the throat of the die opening. However, it is believed to be preferable to provide a groove that has a radius nearly equal to that of the incoming blank in which case the die opening 16 will be oval in shape at the throat and the diameter of the finished blank will be approximately equal to the minor axis of the oval. The rolls in effect constitute circumferentially spaced complementary die segments as set forth in the application referred to above.

The die rolls 15 are mounted on a cage or frame 17 which in turn is supported in bearings 18 for rotation with its axis passing through the center of the die opening 16 and preferably parallel with the axis of the die opening. The frame 17 is rotated by an electric motor 19 and gearing 20. The die rolls themselves may be power driven, as by the electric motor 21 carried by the frame 17, with current supplied to the motor by suitable collector rings 22 and leads 23.

The blank 8 is additionally heated to forming temperature in the dies by passing current through the blank from one die roll to the other. In this way recurrent heating of each successive circumferential portion of the blank is obtained as the blank and frame 17 are rotated relative to each other. Softening of the blank under the resistance heating, combined with the longitudinal feeding of the blank, effects a crowding forward and reduction of the successive longitudinal sections of the blank until the latter emerges in reduced size from the throat of the die rolls.

The die rolls 15 constitute the opposite terminals of the secondary leads 24 of a transformer 25. The leads 24 supply current to the respective rolls through suitable contact bushings 26 on the hubs of the rolls. The transformer is carried by frame 17 and is supplied with primary current by collector rings 27 and leads 28. The transformer and if necessary the die rolls may be water cooled by circulating water therethrough from a suitable inlet and outlet stuffing box connection 29 for the conduits 30.

The pipe emerging from the forming machine is gripped by the rolls 6 which are mounted in a rotary cage 31. The cage is preferably rotated by a motor 32 and gearing 33, although it may be mounted merely for free rotation with the pipe or be connected to the frame 17 to rotate with it. The rolls 6 are driven by an electric motor 34 carried by cage 31 and supplied with current through the collector rings 35 and leads 36.

The thickness of the finished pipe may be varied by utilizing rolls 6 to apply either a longitudinal tension or compression to the pipe as the latter emerges from the throat of the die opening 16. The speed of the rolls 6 relative to the rate at which the pipe would normally emerge from the forming machine if left free, determines the amount of thinning or thickening as compared to the thickness obtained when no longitudinal tension or compression is applied to the pipe.

By driving the electrode die rolls 15 it is possible to prevent thickening of the blank in the forming machine. Where the die rolls 15 are not driven they are left free to rotate under the influence of the incoming blank and the blank wall is thickened by reason of the longitudinal compression forces applied. Where the rolls 15 are driven at a rate faster than that of the incoming blank, the hot metal of the blank in the throat of the die opening will be extended longitudinally and thinned radially just prior to its release by the rolls.

The rotation of cage 9 of feed rolls 4 should be slow, preferably about one revolution per minute so that the hot pipe keeps its straightness as it enters and emerges from the forming machine. The cage 31 of rolls 6 will be rotated at about the same speed as cage 9 but may be varied to oppose the twist in the pipe resulting from the forming operations. If desired, a predetermined spiral twist may be produced in the pipe to provide for a stronger product where there is a possibility of variance as in the weld.

The speed of rotation of frame 17 may be about one hundred revolutions per minute for a six-inch diameter blank and should be determined by the size of the blank. The larger the blank the slower should frame 17 be rotated, while the smaller the blank the faster should frame 17 be rotated. Generally speaking, a frictional surface speed of about 150 feet per minute between the blank 8 and the die rolls 15 should be satisfactory. Too fast a surface speed results in too much frictional heat at the surface. Frictional heat is particularly objectionable for thick blanks.

With relatively thin blanks it may be possible to eliminate the rolls 4 and 6 altogether and rely upon the die rolls 15 for feeding provided suitable means be employed to hold the blank from rotating with the frame 17. Such means may be provided on the pusher 2, if desired.

In order to eliminate end waste where each blank is reduced separately, it is preferable to weld successive blanks end to end before they enter the machine and to cut them apart after they emerge from the machine. For this purpose, the welder 3 and cutter 7 are provided.

The welding station or machine 3 comprises a reciprocating carriage 37 upon which an automatic welding machine 38 is provided for welding a circumferential seam between the ends of two blanks as they are fed longitudinally toward the rolls 4. The welding is preferably accomplished by the electric arc method employing a metallic welding electrode. The length of reciprocation of the carriage 37 should be approximately equal to the length of travel of the blank forwardly in one revolution of the blank so that a single weld bead will be deposited substantially around the circumference of the seam.

The end edges of the blanks may be scarfed to interlock with one another as illustrated in Fig. 6, or in any other suitable manner. With the scarf illustrated the trailing edge of the first blank has a rearwardly extending lip 39 at its inner circumference. The leading edge of the second blank has a lip 40 overlapping the lip 39. A welding groove 41 is provided above the lip 39 of sufficient depth to make sure that the deposited bead 42 will not extend radially beyond the outer circumference of the blanks and cause injury to the rolls or dies.

Instead of employing an automatic arc welding machine 38, it is possible for carriage 37 to be constructed so that a welder can stand on it and manually arc-weld the seam. In either case the carriage 37 is reciprocated by a rod 43 actuated by the pusher 2 so that it travels with it as the latter pushes each succeeding blank out of the furnace.

The welding of the ends of the blank together is effected by maintaining the welding arc for a single revolution of the blanks so that only a single layer of weld metal 42 is deposited in the groove 41. After a circumferential weld is completed, the carriage 37 is returned to starting position adjacent the mouth of furnace 1 and when the next blank is pushed out of the furnace and into abutting relation with the trailing end of the previous blank, the welding operation is repeated.

The flying cutter 7 may be of any suitable construction similar to those provided in tube and pipe mills.

For the purpose of faciltiating the forming operations in die rolls 15, a lubricant is applied to the blank as it enters the die opening 16. Any suitable lubricant may be employed and it may be applied either manually or by suitable feeding means. A good lubricant for the purpose is that set forth in the copending application of Axel Westin, one of the present inventors, Serial No. 458,145, filed September 12, 1942, for Die lubricant for hot forming.

Various embodiments of the invention and various practices may be employed within the scope of the accompanying claims.

The invention is claimed as follows:

1. A tube forming machine, comprising a rotating die having a tapered die opening axially thereof and made up of a plurality of complementary circumferentially spaced die segments constituting electrodes, means to move a cylindrical blank through said die opening to reduce the diameter of the blank, and means to supply electricity to said electrodes to pass a heating current through the blank as the same is passed through the die in contact therewith.

2. In a device of the class described, a rotating die having a tapered die opening axially thereof and about which said die rotates, said die being made up of a plurality of complementary circumferentially separated segments constituting electrodes for feeding current to the blank being formed, a current-collecting ring for each electrode, and means bearing against said current-collecting rings for supplying current thereto.

3. In apparatus of the class described, a die for simultaneously supplying heating current to a cylindrical blank and reducing the diameter thereof, means to produce relative rotation between said die and blank, means to push the blank through the die, and means to pull the blank through the die, the push and pull of said blank being adjusted to effect a predetermined wall thickness for the blank.

4. In apparatus of the class described, a plurality of spaced electrode dies for simultaneously supplying heating current to a cylindrical blank therebetween and reducing the diameter thereof, means to produce relative rotary and axial movements between said dies and blank including means to push the blank longitudinally through the opening between said dies and means to pull the blank through said opening, the push and pull of said blank being adjusted to determine the wall thickness thereof after forming.

5. In apparatus of the class described, a die for reducing the diameter of a cylindrical blank, comprising a plurality of roller electrodes having their peripheries engaging the blank and grooved to define a die opening through which the blank moves axially, said electrodes having their respective axes transverse to the axis of the blank to effect movement of the periphery of the electrodes at the die opening in the direction of movement of the blank, and means to produce relative rotation between said electrodes and blank about the axis of the latter.

6. In apparatus of the class described, a die for reducing the diameter of a cylindrical blank comprising a plurality of roller electrodes having their peripheries engaging the blank and grooved to define a die opening through which the blank moves axially, said electrodes having their respective axes transverse to the axis of the blank to effect movement of the periphery of the electrodes at the die opening in the direction of movement of the blank, and a power drive for rotating the individual electrodes on their respective axes.

7. In apparatus of the class described, a die for reducing the diameter of a cylindrical blank comprising a plurality of roller electrodes having their peripheries engaging the blank and grooved to define a die opening through which the blank moves axially, said electrodes having their respective axes transverse to the axis of the blank to effect movement of the periphery of the electrodes at the die opening in the direction of movement of the blank, and a power drive to provide relative rotation between the electrodes at the die opening and the blank with the axis of the die opening as a center of rotation.

8. In apparatus of the class described, a die for reducing the diameter of a cylindrical blank comprising a plurality of roller electrodes having their peripheries engaging the blank and grooved to define a die opening through which the blank moves axially, said electrodes having their respective axes transverse to the axis of the blank to effect movement of the periphery of the electrodes at the die opening in the direction of movement of the blank, means to rotate the individual electrodes on their respective axes, and means to provide relative rotation between the electrodes at the die opening and the blank with the axis of the die opening as a center of rotation.

9. In apparatus of the class described, a die for reducing the diameter of a cylindrical blank comprising a plurality of roller electrodes having their peripheries engaging the blank and grooved to define a die opening through which the blank moves axially, said electrodes having their respective axes transverse to the axis of the blank to effect movement of the periphery of the electrodes at the die opening in the direction of movement of the blank, and means to produce relative rotation between the blank and the electrodes and to feed the blank axially through said die opening.

10. In apparatus of the class described, a die for reducing the diameter of a cylindrical blank comprising a plurality of roller electrodes having their peripheries engaging the blank and defining a die opening through which the blank moves axially, and a drive to rotate the electrodes bodily with the axis of the die opening as a center while feeding a blank through the die opening.

11. In apparatus of the class described, a die for reducing the diameter of a cylindrical blank comprising a plurality of roller electrodes having their peripheries engaging the blank and grooved to define a die opening through which the blank moves axially, said electrodes having their respective axes transverse to the axis of the blank to effect movement of the periphery of the electrodes at the die opening in the direction of movement of the blank, means to rotate the electrodes bodily with the axis of the die opening as a center, means to rotate the blank in a direction opposite to that of the bodily rotation of the electrodes, and means to feed the blank axially through the die opening.

12. In apparatus of the class described, a die for reducing the diameter of a cylindrical blank comprising a plurality of roller electrodes having their peripheries engaging the blank and defining a die opening through which the blank moves axially, means to rotate the electrodes bodily with the axis of the die opening as a center, means to rotate the blank in a direction opposite to that of the bodily rotation of the electrodes, and means including a power drive for rotating the individual electrodes on their respective axes to feed the blank axially through the die opening.

13. In combination with electrode dies through which tubular blanks are passed successively to reduce the same in diameter, means for feeding successive blanks to the dies, means for effecting relative rotation between the blanks and dies producing a rotational torque in the blank between the dies and feeding means, and means to secure successive blanks together in end-to-end relation on the fly and provide for the transmission of the rotational torque from one blank to the other.

14. In apparatus of the class described, means to feed a tubular blank longitudinally to a forming operation, means to rotate the blank as it is fed forward to the forming operation, means to feed and rotate a second tubular blank in synchronism with the first and with its leading end abutting the trailing end of said first blank, means to center the adjacent ends of the two blanks relative to each other, and means to weld said edges while said blanks are being fed forward and rotated.

15. In apparatus of the class described, means to feed a tubular blank longitudinally to a forming operation, means to slowly rotate the blank as it is fed forward to the forming operation, means to feed and rotate a second tubular blank in synchronism with the first and with its leading end abutting the trailing end of said first blank, means to center the adjacent ends of the two blanks relative to each other, and an electric welder disposed to travel longitudinally with the opposed edges a sufficient distance to effect welding of the same as the blanks rotate.

16. In combination with electrode dies through which tubular blanks are passed successively to reduce the same in diameter, means for feeding successive blanks to the dies, means for rapidly rotating the dies about the axis of the blanks, means for slowly rotating the blanks, and electric arc welding means for securing successive blanks together end to end as the same are slowly rotated and fed forward, the slow rotation of the blanks facilitating the welding operations and serving to modify the speed of relative rotation between the blanks and dies.

17. In the reduction of tubular blanks, preheating a plurality of blanks in a furnace, passing the same successively through a tapered forming die, securing successive blanks end to end as they travel from the furnace to the forming die, relatively rotating the blanks and die, and simultaneously with the engagement of successive portions of the blanks with the die passing a heating current through said portion to facilitate reduction of the same in said die.

18. In the reduction of a tubular blank, pushing the same through a restricted die opening while relatively rotating the blank and die and simultaneously supplying circumferentially flowing resistance heating current to the portion of the blank in said opening as the blank progresses therethrough, and employing an extension secured to the rear end of the blank to feed the same and transmit torque forces thereto during passage of the rear end portion of the blank through the die.

19. In the reduction of a tubular blank, passing the same through a restricted die opening, and simultaneously supplying resistance heating current to the portion of the blank in said opening as the blank progresses therethrough, said first-named step being effected by pushing of the blank axially into the die opening while relatively rotating the blank and die.

20. In the reduction of a tubular blank, passing the same through a restricted die opening, simultaneously supplying resistance heating current to the portion of the blank in said opening as the blank progresses therethrough, said first-named step being effected by pushing of the blank axially into the die opening while relatively rotating the blank and die, and applying a longitudinal force on the blank as it emerges from the die to effect a controlled thickness of the blank wall.

SVEN WESTIN.
AXEL WESTIN.